(12) United States Patent
Kirchner et al.

(10) Patent No.: US 7,135,840 B2
(45) Date of Patent: Nov. 14, 2006

(54) DC/DC CONVERTER CIRCUIT AND METHOD FOR DC/DC CONVERSION

(75) Inventors: Joerg Kirchner, Mauern (DE); Kevin Scoones, Muchen (DE)

(73) Assignee: Texas Instruments Incorporated, Dallas, TX (US)

( * ) Notice: Subject to any disclaimer, the term of this patent is extended or adjusted under 35 U.S.C. 154(b) by 122 days.

(21) Appl. No.: 10/704,418

(22) Filed: Nov. 7, 2003

(65) Prior Publication Data

US 2004/0119450 A1 Jun. 24, 2004

(30) Foreign Application Priority Data

Nov. 27, 2002 (DE) ............... 102 55 357

(51) Int. Cl.
*G05F 1/613* (2006.01)
(52) U.S. Cl. .............. 323/222; 323/225; 323/271; 323/285
(58) Field of Classification Search ............ 323/222, 323/224, 225, 272, 282, 285, 271
See application file for complete search history.

(56) References Cited

U.S. PATENT DOCUMENTS

| | | | | | |
|---|---|---|---|---|---|
| 4,168,477 | A | * | 9/1979 | Burchall | 323/222 |
| 4,347,474 | A | * | 8/1982 | Brooks et al. | 323/224 |
| 5,552,694 | A | * | 9/1996 | Appeltans | 323/222 |
| 5,565,761 | A | * | 10/1996 | Hwang | 323/222 |
| 5,574,357 | A | * | 11/1996 | Otake et al. | 323/222 |
| 5,844,399 | A | * | 12/1998 | Stuart | 323/282 |
| 5,929,615 | A | * | 7/1999 | D'Angelo et al. | 323/224 |
| 6,091,232 | A | * | 7/2000 | Criscione et al. | 323/222 |
| 6,166,527 | A | * | 12/2000 | Dwelley et al. | 323/222 |
| 6,194,880 | B1 | * | 2/2001 | Fraidlin et al. | 323/222 |
| 6,265,854 | B1 | * | 7/2001 | Neuteboom | 323/222 |
| 6,326,774 | B1 | * | 12/2001 | Mueller et al. | 323/222 |
| 6,348,779 | B1 | * | 2/2002 | Sluijs | 323/222 |
| 6,437,545 | B1 | * | 8/2002 | Sluijs | 323/222 |
| 6,657,417 | B1 | * | 12/2003 | Hwang | 323/222 |
| 6,798,177 | B1 | * | 9/2004 | Liu et al. | 323/222 |
| 6,859,020 | B1 | * | 2/2005 | Baldwin et al. | 323/283 |

* cited by examiner

*Primary Examiner*—Jeffrey Sterrett
(74) *Attorney, Agent, or Firm*—Carlton H. Hoel; W. James Brady; Frederick J. Telecky, Jr.

(57) ABSTRACT

A DC/DC converter circuit including an inductance 10, two controllable switches 12, 14 and a controller 16 for controlling the switches 12, 14 is configured so that it is able to operate in two permanently alternating operating time phases. The switches 12, 14 in the DC/DC converter circuit are arranged so that when the controller 16 is in the first operating time phase it closes the first switch 12 and opens the second switch 14 in achieving a flow of energy from the input of the DC/DC converter circuit to the inductance 10 and then when the controller 16 is in the second operating time phase it opens the first switch 12 and closes the second switch 14 in achieving a flow of energy from the inductance 10 to the output of the DC/DC converter circuit. Prior to switching from one operating time phase into the other operating time phase an intermediate time phase is inserted for safety reasons, in which both switches 12, 14 of the DC/DC converter circuit are briefly opened.

3 Claims, 2 Drawing Sheets

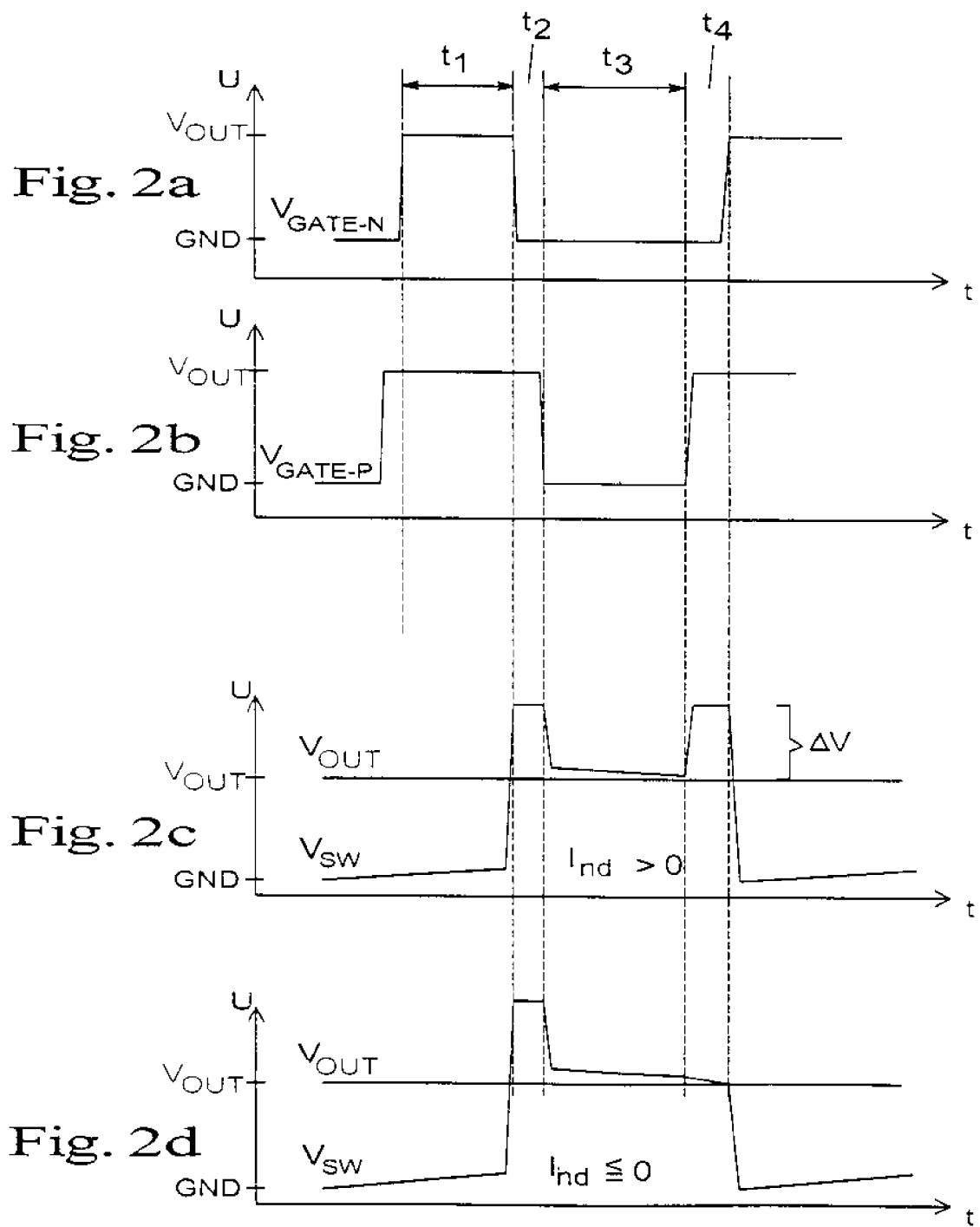

DC/DC CONVERTER CIRCUIT AND METHOD FOR DC/DC CONVERSION

RELATED APPLICATION

The present application is based on priority of German Patent Application No. 102 55 357.2, filed Nov. 27, 2002.

FIELD OF THE INVENTION

The invention relates to a DC/DC converter circuit.

BACKGROUND OF THE INVENTION

DC/DC converter circuits are used in many electronic devices. Their task is to generate one or more DC voltages from an input voltage furnished, for example, by a battery, to apply it to a load connected to the output of the DC/DC converter circuit and to supply the load with the necessary load current. To generate the various voltages and polarities required of the output voltages, use is made of various kinds of DC/DC converter circuits capable of converting the input voltage into a higher, lower or inverted output voltage. The salient design criteria of DC/DC converter circuits are high effectiveness over a wide range of the load current and a straight-forward configuration.

One basic DC/DC converter circuit of the UP converter type, i.e. for converting the input voltage into a higher output voltage is described, for example, in the German Semiconductor Circuit Textbook by U. Tietze and Ch. Schenk, published by Springer-Verlag, 12th edition, 2001 on pages 948–949. This DC/DC converter circuit includes an inductance whose one terminal is connected to the input of the DC/DC converter circuit and whose other terminal is connectable via a first controllable switch to GND and connected to the anode of a diode whose cathode is connected to the output of the DC/DC converter circuit.

Disclosed in German laid-open patent DE 19940419 A1 in FIG. 2 thereof is a circuit in which the diode is replaced by a second controllable switch to eliminate the energy losses caused by the diode.

To control the two switches, the DC/DC converter circuit requires a controller which is connected to the two switches. The controller generates control signals of the switches and serves in addition to regulate the output voltage. One such controller is described, for example, in the aforementioned Textbook by U. Tietze and Ch. Schenk on page 946.

Regulating the output voltage in this case is done via the period of the switching signals for the two switches. These are thereby controlled by means of a pulse width modulator circuit so that the DC/DC converter circuit can operate in two permanently alternating operating time phases.

During the first operating time phase, the first switch is closed and the second switch is open. This permits energy to flow from a voltage source arranged at the input to the inductance. When then in the second operating time phase the first switch is opened and the second switch is closed, energy flows from the inductance to a load applied to the output of the DC/DC converter circuit. During the two time phases, a continually rising and falling flow of current materializes through the inductance.

With the reduction in the load current, the resulting total current flow through the inductance must continually diminish so that during the second operating time phase the current flowing through the inductance can fall to zero or even below zero. This mode in which the current flow is interrupted is associated, however, with a relatively poor efficiency, due to a power loss materializing from the recharging of the switch gate capacitances in the permanent switching action. This is why the DC/DC converter circuit can also operate in a quiescent or "skip" mode in which there is no flow of energy to and from the inductance by both switches being open. Once the output voltage drops below a predefined value, the skip mode needs to be deactivated and the permanently alternating storage of energy in the inductance and output of the energy stored in the inductance recommences.

Deactivating the skip mode is usually detected by a comparator applied to the output of the DC/DC converter circuit which monitors the potential of the output voltage and compares it to a reference voltage. The requirement for activating the skip mode is thus a zero current status of the inductance, it being the direction of the flow of current in the inductance during the time phase t4 that dictates the skip mode being activated. Measuring the flow of current through the inductance in DC/DC converter circuits is done in prior art by an operational amplifier as evident from FIG. 2, for example, of DE 19940419 A1. The operational amplifier is connected by its inverting input to the one terminal of the second switch and by its non-inverting input to the other terminal of the second switch. The ohmic resistance of the second switch in the ON condition results in a drop in voltage as a function of the load current as detected by the operational amplifier.

However, analyzing these analog signals is problematic. Since in most embodiments of the DC/DC converter circuit, the ohmic resistance of the second switch in the ON condition is very low, a corresponding small drop in voltage needs to be detected. When, for example, the switch is configured as a MOSFET the resistance often amounts to but a few tenths of an ohm, thus requiring the operational amplifier to operate with a high gain. In addition, the offset voltage of the operational amplifier makes it difficult to precisely define the switching threshold. Possible deviations in the tolerance of the components involved in the operational amplifier likewise need to be taken into account. Safely engineering the switching action is thus only possible with complicated circuitry and often necessitating tailored calibration of the individual DC/DC converter circuits.

SUMMARY OF THE INVENTION

The invention is thus based on the objective of providing a DC/DC converter circuit permitting a safe switching action between the operating mode and skip mode of the circuit. In addition, it is intended that the DC/DC converter circuit be of simple configuration for cost-effective production. Furthermore, the invention has the objective of providing a particularly simple method of DC/DC conversion.

This objective is achieved for a DC/DC converter circuit of the aforementioned kind in accordance with the invention in that prior to switching from one operating time phase to the other operating time phase an intermediate time phase is inserted for safety reasons, in which both switches of the DC/DC converter circuit are briefly opened and the DC/DC converter circuit comprising, in addition, a skip mode detector configured so that the voltage at the terminal of the inductance connected to the second switch is detected during the intermediate time phases and from the temporal development in the values of the detected voltage it can be determined whether the DC/DC converter circuit is to be switched to the skip mode in which the first and the second controllable switches are permanently open.

Now, with the novel DC/DC converter circuit in accordance with the invention the switching action from the operating mode into the skip mode is substantially safer because the occurrence of a voltage step at an internal node in the circuit is analyzed as may be done e.g. digitally. This does away with the analog circuit blocks used hitherto in DC/DC converter circuits so that complicated means of calibration are now no longer needed in the DC/DC converter circuit in accordance with the invention. The DC/DC converter circuit in accordance with the invention has a simple configuration and can thus be produced cost-effectively.

The objective in accordance with the invention is also achieved by a method in accordance with the invention for DC/DC conversion including an inductance including the steps of: activating a first operating time phase in which energy is stored in the inductance; activating a second operating time phase in which the energy stored in the inductance is output and employed to generate a converted voltage; activating an intermediate time phase between the operating time phases for safety reasons in which there is no flow of energy to the inductance; monitoring during the operating time phases and intermediate time phases the voltage at the terminal of the inductance via which the stored energy is output and determining from the temporal development of the values of the monitored voltage whether the DC/DC converter circuit is to be switched into the skip mode in which there is no energy flow to or from the inductance.

Advantageous further aspects of the invention are characterized in the subclaims.

BRIEF DESCRIPTION OF THE DRAWINGS

The invention will now be detailed by way of example with reference to the drawing in which:

FIGS. 2a–2d are graphs plotting the time profile of the gating voltages applied to the switches as used in a circuit as shown in FIG. 1 as well as the time profile of the voltage appearing at a defined node in the circuit.

DETAILED DESCRIPTION OF THE DRAWINGS

Figure 1:
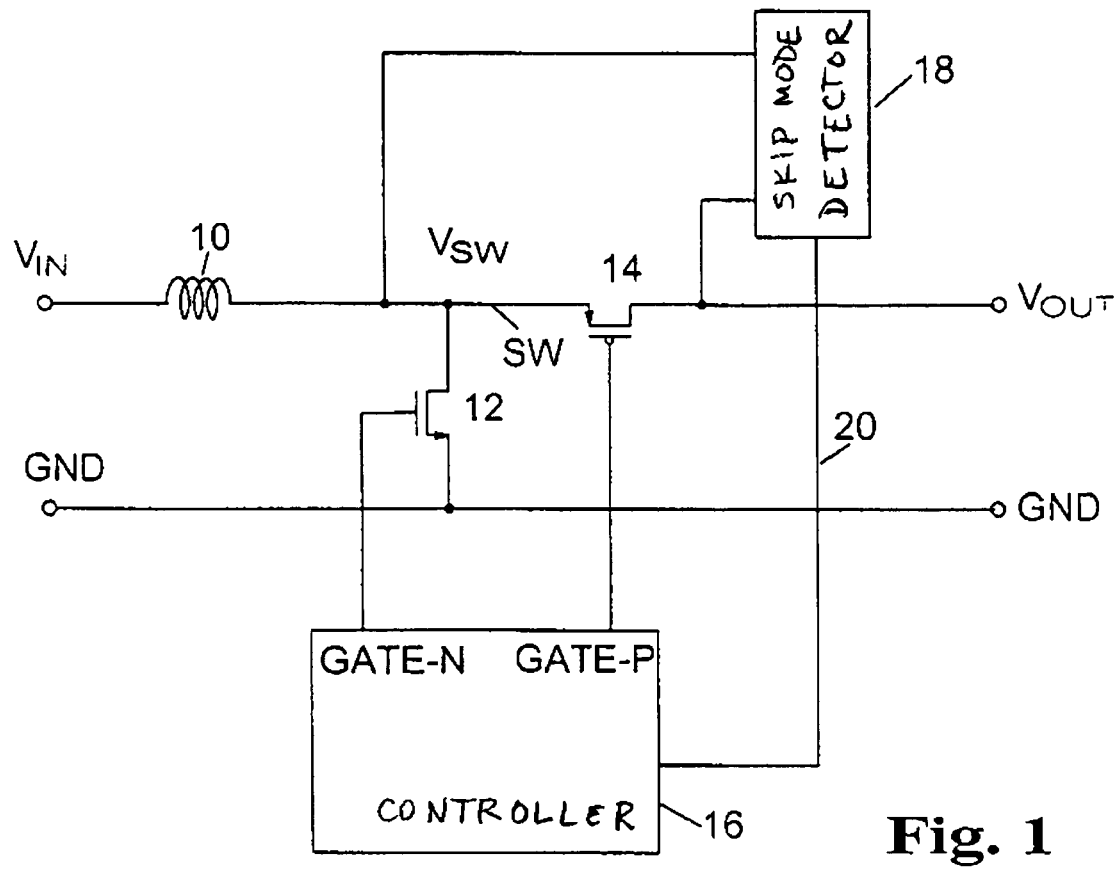
FIG. 1 is a circuit diagram of a first embodiment of a DC/DC converter circuit in accordance with the invention.

Referring now to FIG. 1, there is illustrated one embodiment of a DC/DC converter circuit in accordance with the invention as an UP converter including an inductance 10, a first switch 12, a second switch 14, a controller 16 and a skip mode detector 18. In this embodiment of the DC/DC converter circuit in accordance with the invention, the switches are formed by MOSFETs. The first switch 12 is a NMOS-FET, the second switch 14 a PMOS-FET. To minimize the power losses of the switches, the MOSFETs are usually configured with a large drain/source channel width so that when turned on they feature a low forwards resistance. As an alternative, the two switches may also be formed e.g. by bipolar transistors.

The inductance 10 is arranged so that its one terminal is connected to the terminal for the input voltage $V_{IN}$ of the DC/DC converter circuit and its other terminal to the drain of the NMOS-FET 12 and the source of the PMOS-FET 14. The source of the NMOS-FET 12 is, in addition, connected to the fixed reference potential GND as may be, for example, GND. The drain of the PMOS-FET 14 is connected to the terminal for the output voltage $V_{OUT}$ of the DC/DC converter circuit. The gates of the NMOS-FET 12 and PMOS-FET 14 are each connected to a controller 16.

The controller 16 generates at its outputs GATE-N and GATE-P the gating voltages $V_{GATE-N}$ and $V_{GATE-P}$ respectively.

The drain and source of the PMOS-FET 14 are, in addition, connected to a skip mode detector 18. The output of the skip mode detector 18 is connected via a conductor 20 to the controller 16.

The controller 16 is configured so that it can handle control of the two MOSFETs acting as switches and, for example, provide regulation of the output voltage $V_{OUT}$ by means of pulse width modulation. A circuit for pulse width modulation capable of generating these control signals is described, for example, in the aforementioned textbook of Tietze and Schenk on page 949. It is a simple matter to modify this circuit so that it can be put to use as a component of the DC/DC converter circuit in accordance with the invention.

The embodiment of the DC/DC converter circuit in accordance with the invention will now be described for the case of its input voltage $V_{IN}$ being positive as compared to a reference potential GND. However, the person skilled in the art is aware of how he can modify the DC/DC converter circuit in accordance with the invention so that it will also work with inverted potential conditions, for example, by replacing transistors of a first conductance type by transistors of a second conductance type.

Referring now to FIGS. 2a and 2b, there is illustrated the profile of the gating voltages $V_{GATE-N}$ and $V_{GATE-P}$ respectively. To safely turn off the PMOS-FET 14, the gating voltage $V_{GATE-P}$ needs to assume a voltage substantially corresponding to the output voltage $V_{OUT}$. The simplest way of achieving this is to operate the parts of the controller 16 generating the gating voltages with the output voltage $V_{OUT}$.

The controller 16 is configured so that the DC/DC converter circuit can be operated in the two permanently alternating operating time phases.

In this arrangement, the NMOS-FET 12 is turned on in the first operating time phase t1, PMOS-FET 14 being turned on in the second operating time phase t3. Between these two time phases, so-called intermediate time phases are inserted for safety reasons in which both switches are open for a specific time phase t2 and t4 respectively. These intermediate time phases are inserted to prevent both transistors from being turned on temporarily because of the difference in the switching times of the NMOS-FET 12 and PMOS-FET 14 which would otherwise result in the output voltage $V_{OUT}$ being shorted to GND.

The permanently alternating switching action of these two operating time phases occurs only when a critical minimum current flows at the output of the DC/DC converter circuit. In this case, a continually rising and falling current flows through the inductance 10.

A drop in the load current automatically results in the total current flowing through the inductance becoming continually less so that during the second operating time phase the current through the inductance may drop to zero or even below zero. When this happens, the inductance 10 has no flow of current during the second operating time phase. The DC/DC converter circuit is then switched to the skip mode in which both the NMOS-FET 12 and PMOS-FET 14 are turned off so that there is no further flow of energy to and from the inductance 10. The occurrence of this condition with no flow of current through the inductance 10 can be detected by means of the skip mode detector 20 as will now be explained.

Referring now to FIG. 1 there is illustrated a circuit node SW formed by the source of PMOS-FET 14, the drain of NMOS-FET 12 and the one terminal of the inductance 10. The plot of the voltage Vsw at the node SW as shown in FIG. 2c represents the case in which during both operating time phases the current Iind continual flows through the inductance 10.

During time phase t1, i.e. the first operating time phase of the DC/DC converter circuit, there is a flow of current from the terminal of the input voltage VIN through the inductance 10 to the reference potential GND. The inductance 10 converts in this operating mode the electrical energy into magnetic energy and stores it. Accordingly, during time phase t1 there is a flow of energy from the input of the DC/DC converter circuit to the inductance 10. The node SW has substantially the same potential as the reference potential GND. In the first operating time phase, the current flowing through the inductance 10 increases linearly with time so that due to the every increasing drop in voltage across the finite forwards resistor of the NMOS-FET 12 a slight increase in the voltage Vsw at node SW occurs.

During the first intermediate time phase, t2, both transistors are OFF. Since energy is stored in the inductance 10 the node SW increases voltagewise until the voltage at the source of the PMOS-FET 14 is higher by the threshold voltage of the PMOS-FET 14 than the gating voltage VGATE-P of the PMOS-FET 14. The 20 PMOS-FET 14 is then returned ON and the voltage Vsw remains practically constant.

In the second operating time phase, NMOS-FET 12 is OFF, and PMOS-FET 14 is ON. During time phase t3, there is thus a flow of energy to the output of the DC/DC converter circuit since the stored magnetic energy of the inductance 10 is reconverted into an electric current. The inductance 10 serves as the energy source and the output voltage VOUT is increased relative to the input voltage VIN by the voltage of the inductance 10, since the inductance 10 is connected in series with the input voltage source. The voltage Vsw remains practically constant, and due to the finite forwards resistance of the PMOS-FET 14, a slight decrease in the voltage profile occurs as shown in FIG. 2c.

During the second intermediate time phase t4, both transistors are OFF. Since because of the inductance 10 current continues to flow, the node SW will increase in voltage the same as in the first intermediate time phase as described above. When the voltage at the source of PMOS-FET 14 is higher than the gating voltage VGATE-P at PMOS-FET 14 by the threshold voltage of the PMOS-FET 14 PMOSFET 14 is returned ON and voltage Vsw remains constant for time phase t4.

This, as is known, is the way in which an UP converter works. By inserting a capacitor of high capacitance between output voltage VOUT terminal and the reference potential GND (not shown), it is possible to further stabilize the output voltage VOUT. In this arrangement, the output voltage VOUT can be set to a value directly materializing from the ratio of time phase t1 to time phase t3 for a fixed current requirement at the output of the DC/DC converter circuit.

The overall result is thus a voltage profile at the node SW which in both operating time phases tracks the output voltage VOUT and reference potential GND respectively and features in the intermediate time phases a characteristic voltage step ΔV corresponding in amount to that of the output voltage VOUT increased by the threshold voltage of PMOS-FET 14.

Referring now to FIG. 2d, there is illustrated the profile of the voltage Vsw at the node SW for the case in which the output of the DC/DC converter circuit is to be supplied with a near or totally disappearing current. In this case, time phases t1 and t3 are to be defined by the controller 16 so that the current $I_{ind}$ becomes zero or even less than zero during the second operating time phase.

During the first operating time phase, the node SW has in turn substantially the same potential as the reference potential GND. The current flowing through the inductance 10 increases linearly during time phase t1, resulting in a slight increase in the voltage Vsw at node SW the same as in the aforementioned case.

In the first intermediate time phase t2, the two transistors are OFF. Since energy is stored in the inductance, the node SW continues to increase voltagewise until the voltage at the source of PMOS-FET 14 is higher than the gating voltage VGATE-P at PMOS-FET 14 by the threshold voltage of PMOS-FET 14. PMOS-FET 14 is then returned ON and the voltage Vsw remains practically constant.

In the second operating time phase t3, PMOS-FET 14 is turned on and all of the energy stored in the inductance 10 flows to the load connected to the output of the DC/DC converter circuit, whereas the voltage Vsw remains practically constant, as evident from FIG. 2d.

During the second intermediate time phase t4, both transistors are OFF, but since no current or a negative current flows through the inductance 10 the node SW will not increase voltagewise unlike the aforementioned case.

The result, in all, is a voltage profile at the node SW which during both operating time phases tracks the output voltage VOUT and reference potential GND respectively and features in the first intermediate time phase a characteristic voltage step ΔV corresponding to the output voltage VOUT increased by the threshold voltage of the PMOS-FET 14, whereas in the second intermediate time phase there is no voltage step ΔV, as is evident from FIG. 2d.

The skip mode detector 18 is able to "see" this response of the voltage Vsw at the node SW so that as soon as there is no current flow through the inductance 10 the DC/DC converter circuit is switched to a skip mode.

Figure 3:
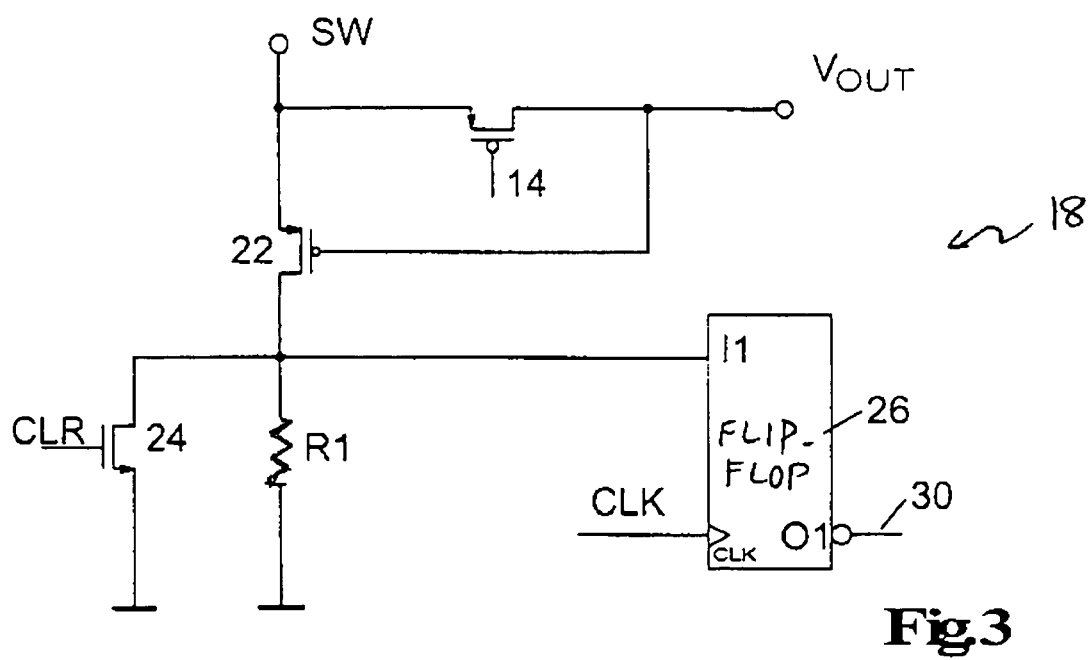
FIG. 3 is a circuit diagram of a skip mode detector as used in a further embodiment of the DC/DC converter circuit in accordance with the invention.

Referring now to FIG. 3 there is illustrated an embodiment of the skip mode detector 18 configured so that it is able to "see" the aforementioned response of the voltage Vsw at the node SW. For this purpose, the node SW is connected to the source of a further PMOS-FET 22 whose gate is connected to the output voltage VOUT terminal. The PMOS-FET 22 is configured so that its threshold voltage is lower than the threshold voltage of the PMOS-FET 14. As an alternative one could also select the gating voltage of the PMOS-FET 22 lower than that of the PMOS-FET 14.

The drain of the PMOS-FET 22 is connected to a terminal of a resistor R1, the drain of the further NMOS-FET 24 and the input I1 of a storage element 26. In this simple embodiment the storage element 26 is formed a slope-triggered flip-flop 26, but other means of achieving this will be appreciated by the person skilled in the art. The clock input of the slope-triggered flip-flop 26 is connected to the control signal CLK and the output O1 of the slope-triggered flip-flop 26 is connected to the control conductor 30 via which the controller 16 is able to activate the skip mode.

The source of the NMOS-FET 24 and the other terminal of the resistor R1 are connected to a fixed reference potential which, for example, may be GND. The gate of the NMOS- FET 24 is connected to a control signal CLR which, like the control signal CLK, can also be derived from the gating voltage $V_{GATE-P}$ and $V_{GATE-N}$ respectively.

When a voltage step ΔV appears at the node SW during an intermediate time phase the source of the PMOS-FET 22 has a potential which is higher than the output voltage $V_{OUT}$ by the threshold voltage of the PMOS-FET 14. Since the threshold voltage of the PMOS-FET 22 is lower than that of the PMOS-FET 14, PMOS-FET 22 is turned on and input I1 of the slope-triggered flip-flop 26 is 20 shifted from ground to a higher voltage level, corresponding to a change from logic 0 to logic 1. On timeout of the second intermediate time phase, this status can be stored with the slope-triggered flip-flop 26. For this purpose slope-triggered flip-flop 26 is triggered by the leading edge of the control signal CLK. For this control signal CLK the gating voltage $V_{GATE-N}$ may be used, for example, since this signal marks the end of the second intermediate time phase.

Should no voltage step ΔV appear at the node SW during the second intermediate time phase, the input of the slope-triggered flip-flop 26 remains logic 0, this status being likewise stored at the end of the second intermediate time phase by the slope-triggered flip-flop 26.

In the first intermediate time phase, PMOS-FET 14 is ON as is stored by the parasitic capacitances at the input I1 of the slope-triggered flip-flop 26, the discharge of which could be made via the resistor R1. In the skip mode detector 18 as shown in FIG. 3, NMOS-FET 24 is used to deactivate the logic 1. The control signal CLR of the NMOS-FET 24 is derived, for example, from a signal which is active when the PMOS-FET 14 is ON. Because of this, the value of the resistor R1 may be very large since discharge of the parasitic capacitances no longer takes place via this resistor R1.

The skip mode detector 18 can thus be achieved simply by a digital circuit. The conductor 30 connected to the output of the NMOS-FET 24 activates the skip mode by the controller 16.

With increasing load current, the skip mode must again be deactivated. For this purpose a comparator may be applied to the output of the DC/DC converter circuit, for example, and a reference voltage source connected to an input of the comparator to sense the voltage at the output of the DC/DC converter circuit in the skip mode. From the value of the voltage at the output of the DC/DC converter circuit, the skip mode detector 18 is able to "see" whether the skip mode needs to be deactivated.

During the skip mode, all components of the DC/DC converter circuit—except for the comparator and reference voltage source—can be turned off to make sure that the NMOS-FET 12 and PMOS-FET 14 remain open. Turning off these components of the circuit reduces the current consumption in the DC/DC converter circuit in accordance with the invention so that, in all, a very high 25 efficiency materializes.

Described above is an embodiment of a DC/DC converter circuit in accordance with the invention configured in the form of an UP converter. However, the person skilled in the art will readily appreciate from this description that it is not restricted to this case and that it can be designed to function e.g. as a down converter, inverter converter or single-ended primary inductance converter (SEPIC).

In the DC/DC converter circuit, in accordance with the invention, sensing the direction of the flow of current through the inductance during time phase t4 is done by a digital circuit which reliably signals activation of the skip mode. It is more particularly to be noted that no analog components are included as in prior art DC/DC converter circuits, for instance, thus eliminating the complicated circuitry needed therefore.

The invention claimed is:

1. A DC/DC converter circuit comprising:
   an inductance (10),
   first and second controllable switches (12, 14),
   a controller (16) for controlling said switches (12, 14) so that said DC/DC converter circuit is able to operate in two alternating operating time phases,
   said switches (12, 14) in said DC/DC converter circuit being arranged so that when said controller (16) is in the first operating time phase it closes said first switch (12) and opens said second switch (14) in achieving a flow of energy from the input of said DC/DC converter circuit to said inductance (10), and
   then when said controller (16) is in the second operating time phase it opens said first switch (12) and closes said second switch (14) in achieving a flow of energy from said inductance (10) to the output of said DC/DC converter circuit,
   wherein prior to switching from one operating time phase to the other operating time phase an intermediate time phase is inserted, in which both switches (12, 14) of said DC/DC converter circuit are opened, and
   a skip mode detector (18) configured so that the voltage at a terminal of said inductance (10) connected to said second switch is detected during said intermediate time phase and from the temporal development in the values of said detected voltage (VSW) it can be determined whether said DC/DC converter circuit is to be switched to a skip mode in which operation said first and said second controllable switches (12, 14) is halted,
   wherein said skip mode detector (18) comprises a further PMOS-FET (22) and a resistor (R1), said further PMOS-FET (22) being configured so that its threshold voltage is smaller than the threshold voltage of said first PMOS-FET (14), the source of said further PMOS-FET (22) is connected to the source of said first PMOS-FET (14), the gate of said further PMOS-FET (22) is connected to the output of said DC/DC converter circuit, the drain of said further PMOS-FET (22) is connected to the first terminal of said resistor (R1), the second terminal of said resistor (R1) to said reference potential (GND) and said skip mode detector (18) comprises in addition a storage element (26) for storing the switching status of said further PMOS-FET (22).

2. The DC/DC converter circuit as set forth in claim 1 wherein said storage element consists of a slope-triggered flip-flop (26) whose input (I1) is connected to the drain of said further PMOS-FET (22) and whose clock signal (CLK) can be derived from the switching status of said first switch.

3. The DC/DC converter circuit as set forth in claim 1 wherein said skip mode detector (18) comprises a further NMOS-FET (24), the drain of said further NMOS-FET (24) is connected to the first terminal of said resistor (R1), the source of said further NMOS-FET (24) is connected to the second terminal of said resistor (R1) and the gate of said further NMOS-FET (24) is connected to a signal derived from the control signal of said second switch.

* * * * *